United States Patent
Even

(10) Patent No.: US 6,887,933 B2
(45) Date of Patent: May 3, 2005

(54) AQUEOUS ACRYLIC EMULSION POLYMER COMPOSITION

(75) Inventor: Ralph Craig Even, Blue Bell, PA (US)

(73) Assignee: Rohm and Haas Company, Phildaelphia, PA (US)

(*) Notice: Subject to any disclaimer, the term of this patent is extended or adjusted under 35 U.S.C. 154(b) by 291 days.

(21) Appl. No.: 10/040,170

(22) Filed: Oct. 22, 2001

(65) Prior Publication Data

US 2002/0090459 A1 Jul. 11, 2002

Related U.S. Application Data

(63) Continuation-in-part of application No. 09/882,024, filed on Jun. 18, 2001, now abandoned.
(60) Provisional application No. 60/234,917, filed on Sep. 25, 2000.

(51) Int. Cl.⁷ .......................... C08L 33/00; C08L 33/02; C08L 33/08; C08L 33/10
(52) U.S. Cl. ...................... 524/556; 524/560; 524/561; 524/832; 526/224; 526/229
(58) Field of Search ................................ 524/556, 560, 524/561, 832; 526/224, 229

(56) References Cited

U.S. PATENT DOCUMENTS

| | | | | |
|---|---|---|---|---|
| 2,976,203 A | * | 3/1961 | Young et al. ............... | 156/152 |
| 3,238,159 A | * | 3/1966 | Di Benedetti et al. ...... | 427/391 |
| 3,238,168 A | * | 3/1966 | Wolfe et al. ............. | 427/389.9 |
| 3,547,847 A | * | 12/1970 | Levine et al. ............... | 524/313 |
| 4,423,199 A | * | 12/1983 | Chang et al. ............... | 507/120 |
| 4,814,373 A | | 3/1989 | Frankel et al. ............. | 524/460 |
| 5,731,377 A | * | 3/1998 | Friel .......................... | 524/522 |
| 5,756,574 A | * | 5/1998 | Baumstark et al. ......... | 524/458 |
| 5,874,498 A | | 2/1999 | Daniels et al. ............. | 524/563 |
| 5,990,228 A | * | 11/1999 | Eichman et al. ............ | 524/529 |
| 6,251,986 B1 | * | 6/2001 | Ide et al. .................... | 524/547 |
| 6,403,703 B1 | * | 6/2002 | Slone ......................... | 524/832 |

FOREIGN PATENT DOCUMENTS

| WO | WO 99/18157 | 4/1999 |
|---|---|---|
| WO | WO 99/61496 | 12/1999 |

* cited by examiner

*Primary Examiner*—Judy M. Reddick
(74) *Attorney, Agent, or Firm*—Ronald D. Bakule; Robert W. Stevenson

(57) ABSTRACT

An aqueous acrylic emulsion polymer including, as copolymerized units, 70 to 99.5% by weight, based on dry polymer weight, monoethylenically unsaturated nonionic (meth)acrylic monomer and from 0.3 to 10% by weight, based on dry polymer weight, monoethylenically unsaturated acid monomer, wherein at least 40% by weight, based on dry polymer weight, of the emulsion polymer is formed by redox polymerization in the presence of 0.001 to 0.05 moles chain transfer agent per kg dry polymer weight is provided. An aqueous coating composition including the acrylic emulsion polymer, a method for improving the scrub resistance of a dry coating, a method for improving the adhesion of a dry coating, and a method for improving the adhesion of a dry coating to an alkyd substrate are provided.

7 Claims, No Drawings

AQUEOUS ACRYLIC EMULSION POLYMER COMPOSITION

This is a Continuation-in-part of nonprovisional application Ser. No. 09/882,024 filed Jun. 18, 2001, now abandoned, which is a nonprovisional application of prior provisional application No. 60/234,917 filed Sep. 25, 2000.

This invention relates to an aqueous acrylic emulsion polymer suitable for providing dry coatings having improved scrub resistance. More particularly, this invention relates to an aqueous acrylic emulsion polymer including, as copolymerized units, 70 to 99.5% by weight, based on dry polymer weight, monoethylenically unsaturated nonionic (meth)acrylic monomer and from 0.3 to 10% by weight, based on dry polymer weight, monoethylenically unsaturated acid monomer, wherein at least 40% by weight, based on dry polymer weight, of the emulsion polymer is formed by redox polymerization in the presence of 0.001 to 0.05 moles chain transfer agent per kg dry polymer weight. The invention also relates to an aqueous coating composition including the acrylic emulsion polymer and to a method for improving the scrub resistance of a dry coating including applying the aqueous coating composition to a substrate; and drying, or allowing to dry, the aqueous coating composition.

The present invention serves to provide a dry coating including a predominantly acrylic emulsion polymer binder of a certain composition prepared by a certain process which coating exhibits improved scrub resistance by which is meant herein improved scrub resistance relative to that of dry coatings which incorporate acrylic emulsion polymer binder not so constituted and concurrently provides a level of alkaline resistance suitable for utility over alkaline substates such as masonry substrates.

PCT Patent Application WO 9918157 directed to scrub-resistant latexes discloses compositions prepared by a two stage polymerization wherein a monomer effective to enhance the wet adhesion properties of the polymer is included in either or both stages.

Scrub resistance is a generally recognized desirable characteristic of a coating. The problem faced by the inventors is the provision of a suitable emulsion polymer, aqueous coating composition, and a method for improving the scrub resistance of a coating so that a useful level of scrub resistance can be effected. Alternative effective polymerization processes to achieve this end are desired. We have now found that that certain predominantly acrylic emulsion polymer compositions prepared wherein at least 40% by weight, based on dry polymer weight, of the emulsion polymer is formed by redox polymerization in the presence of 0.001 to 0.05 moles chain transfer agent per kg dry polymer provide useful levels of scrub resistance and suitable alkaline resistance.

In a first aspect of the present invention there is provided an aqueous acrylic emulsion polymer including, as copolymerized units, 70 to 99.5% by weight, based on dry polymer weight, monoethylenically unsaturated nonionic (meth)acrylic monomer and from 0.3 to 10% by weight, based on dry polymer weight, monoethylenically unsaturated acid monomer, wherein at least 40% by weight, based on dry polymer weight, of the emulsion polymer is formed by redox polymerization in the presence of 0.001 to 0.05, preferably 0.0025 to 0.025 moles chain transfer agent per kg dry polymer weight.

In a second aspect of the present invention there is provided an aqueous coating composition including an aqueous acrylic emulsion polymer, the polymer including, as copolymerized units, 70 to 99.5% by weight, based on dry polymer weight, monoethylenically unsaturated nonionic (meth)acrylic monomer and from 0.3 to 10% by weight, based on dry polymer weight, monoethylenically unsaturated acid monomer, wherein at least 40% by weight, based on dry polymer weight, of the emulsion polymer is formed by redox polymerization in the presence of 0.001 to 0.05, preferably 0.0025 to 0.025 moles chain transfer agent per kg dry polymer weight.

In a third aspect of the present invention there is provided a method for improving the scrub resistance of a dry coating including a) forming an aqueous coating composition including an aqueous acrylic emulsion polymer, the polymer including, as copolymerized units, 70 to 99.5% by weight, based on dry polymer weight, monoethylenically unsaturated nonionic (meth)acrylic monomer and from 0.3 to 10% by weight, based on dry polymer weight, monoethylenically unsaturated acid monomer, wherein at least 40% by weight, based on dry polymer weight, of the emulsion polymer is formed by redox polymerization in the presence of 0.001 to 0.05, preferably 0.0025 to 0.025 moles chain transfer agent per kg dry polymer weight; b) applying the coating composition to a substrate; and c) drying, or allowing to dry, the applied coating composition.

In other aspects of the present invention there are provided a method for improving the adhesion of a dry coating and a method for improving the adhesion of a coating to an alkyd substrate.

The aqueous acrylic emulsion polymer contains, as copolymerized units, 70 to 99.5% by weight, based on dry polymer weight, monoethylenically-unsaturated nonionic (meth)acrylic monomer including esters, amides, and nitrites of (meth)acrylic acid, such as, for example, (meth)acrylic ester monomer including methyl acrylate, ethyl acrylate, butyl acrylate, 2-ethylhexyl acrylate, decyl acrylate, lauryl acrylate, stearyl acrylate, methyl methacrylate, butyl methacrylate, hydroxyethyl methacrylate, hydroxypropyl methacrylate, aminoalkyl (meth)acrylate, N-alkyl aminoalkyl (meth)acrylate, N,N-dialkyl aminoalkyl (meth)acrylate; urieido (meth)acrylate; (meth)acrylonitrile and (meth)acrylamide. The use of the term "(meth)" followed by another term such as acrylate, acrylonitrile, or acrylamide, as used throughout the disclosure, refers to both acrylate, acrylonitrile, or acrylamide and methacrylate, methacrylonitrile, and methacrylamide, respectively. By "nonionic monomer" herein is meant that the copolymerized monomer residue does not bear an ionic charge between pH=1–14.

The aqueous emulsion polymer contains, as copolymerized units, from 0.3 to 10% by weight, based on dry polymer weight, monoethylenically-unsaturated acid monomer such as, for example, acrylic acid, methacrylic acid, crotonic acid, itaconic acid, sulfoethyl methacrylate, phosphoethyl methacrylate, fumaric acid, maleic acid, monomethyl itaconate, monomethyl fumarate, monobutyl fumarate, and maleic anhydride. Preferably, the emulsion polymer contains, as copolymerized units, from 0.3 to 2.5% by weight, based on dry polymer weight, (meth)acrylic acid.

The aqueous emulsion polymer further contains, as copolymerized units, from 0 to 29.5% by weight, based on dry polymer weight, of optional monomers which are neither nonionic monoethylenically-unsaturated nonionic (meth)acrylic monomers nor monoethylenically-unsaturated acid monomers. Optional monomers may include, for example, styrene or alkyl-substituted styrenes; butadiene; vinyl acetate, vinyl propionate, or other vinyl esters; vinyl monomers such as vinyl chloride, vinylidene chloride, and N-vinyl pyrollidone; allyl methacrylate, vinyl toluene, vinyl benzophenone, diallyl phthalate, 1,3-butylene glycol dimethacrylate, 1,6-hexanedioldiacrylate, and divinyl benzene.

The emulsion polymer used in this invention is substantially uncrosslinked, when it is applied to a substrate in the method of this invention, although low levels of deliberate or adventitious crosslinking may be present. When low levels of precrosslinking or gel content are desired low levels of optional nonionic multi-ethylenically unsaturated monomers such as, for example, 0.1%–5%, by weight based on the dry polymer weight, may be used. It is important, however, that the quality of the film formation is not materially impaired.

The polymerization techniques used to prepare the acrylic emulsion polymer of this invention are well known in the art. Conventional surfactants may be used such as, for example, anionic and/or nonionic emulsifiers such as, for example, alkali metal or ammonium salts of alkyl, aryl, or alkylaryl sulfates, sulfonates or phosphates; alkyl sulfonic acids; sulfosuccinate salts; fatty acids; ethylenically unsaturated surfactant monomers; and ethoxylated alcohols or phenols. The amount of surfactant used is usually 0.1% to 6% by weight, based on the weight of monomer. A redox initiation process is used. The reaction temperature is maintained at a temperature lower than 100° C. throughout the course of the reaction. Preferred is a reaction temperature between 30° C. and 95° C., more preferably between 50° C. and 90° C. The monomer mixture may be added neat or as an emulsion in water. The monomer mixture may be added in one or more additions or continuously, linearly or not, over the reaction period, or combinations thereof. The redox system includes an oxidant and a reductant. One or more oxidants such as, for example, hydrogen peroxide, sodium peroxide, potassium peroxide, t-butyl hydroperoxide, t-amyl hydroperoxide, cumene hydroperoxide, ammonium and/or alkali metal persulfates, sodium perborate, perphosphoric acid and salts thereof, potassium permanganate, and ammonium or alkali metal salts of peroxydisulfuric acid, typically at a level of 0.01% to 3.0% by weight, based on dry polymer weight, are used. At least one suitable reductant such as, for example, sodium sulfoxylate formaldehyde, alkali metal and ammonium salts of sulfur-containing acids, such as sodium sulfite, bisulfite, thiosulfate, hydrosulfite, sulfide, hydrosulfide or dithionite, formadinesulfinic acid, hydroxymethanesulfonic acid, acetone bisulfite, amines such as ethanolamine, glycolic acid, glyoxylic acid hydrate, ascorbic acid, isoascorbic acid, lactic acid, glyceric acid, malic acid, 2-hydroxy-2-sulfinatoacetic acid, tartaric acid and salts of the preceding acids typically at a level of 0.01% to 3.0% by weight, based on dry polymer weight, is used. Redox reaction catalyzing metal salts of iron, copper, manganese, silver, platinum, vanadium, nickel, chromium, palladium, or cobalt may optionally be used. The oxidant and reductant are typically added to the reaction mixture in separate streams, preferably concurrently with the monomer mixture. The polymerization is preferably carried out at pH of 4 to 8.

Further, a chain transfer agent such as, for example, isopropanol, halogenated compounds, n-butyl mercaptan, n-amyl mercaptan, n-dodecyl mercaptan, t-dodecyl mercaptan, alkyl thioglycolate, mercaptopropionic acid, and alkyl mercaptoalkanoate in an amount of 0.001 to 0.05, preferably 0.0025 to 0.05 moles per kg dry polymer weight, is used. Linear or branched $C_4$–$C_{22}$ alkyl mercaptans such as n-dodecyl mercaptan and t-dodecyl mercaptan are preferred. Chain transfer agent(s) may be added in one or more additions or continuously, linearly or not, over most or all of the entire reaction period or during limited portion(s) of the reaction period such as, for example, in the kettle charge and in the reduction of residual monomer stage.

However, at least 40% by weight, preferably at least 75% by weight, more preferably at least 95% by weight, based on dry polymer weight, of the emulsion polymer is formed by redox polymerization in the presence of 0.001 to 0.05 moles chain transfer agent per kg dry polymer weight. By "at least 40% by weight, based on dry polymer weight, of the emulsion polymer is formed by redox polymerization in the presence of 0.001 to 0.05 moles chain transfer agent per kg dry polymer weight" is meant herein that at least 40% by weight, based on dry polymer weight, of the emulsion polymer is formed by redox emulsion polymerization and that this polymerization is effected contemporaneously with the prior presence and/or addition of a total of 0.001 to 0.05 moles chain transfer agent per kg dry polymer weight. The emulsion polymerization is contemplated to include embodiments where some of the polymer is introduced by a polymer seed, formed in situ or not, or formed during hold periods or formed during periods wherein the monomer feed has ended and residual monomer is being converted to polymer.

In another aspect of the present invention the emulsion polymer may be prepared by a multistage emulsion polymerization process, in which at least two stages differing in composition are polymerized in sequential fashion. Such a process usually results in the formation of at least two mutually incompatible polymer compositions, thereby resulting in the formation of at least two phases within the polymer particles. Such particles are composed of two or more phases of various geometries such as, for example, core/shell or core/sheath particles, core/shell particles with shell phases incompletely encapsulating the core, core/shell particles with a multiplicity of cores, and interpenetrating network particles. In all of these cases the majority of the surface area of the particle will be occupied by at least one outer phase and the interior of the particle will be occupied by at least one inner phase. Each of the stages of the multi-staged emulsion polymer may contain the same monomers, surfactants, redox initiation system, chain transfer agents, etc. as disclosed herein-above for the emulsion polymer. In the case of a multi-staged polymer particle the Tg for the purpose of this invention is to be calculated by the Fox equation as detailed herein using the overall composition of the emulsion polymer without regard for the number of stages or phases therein. Similarly, compositional quantities for a multi-staged polymer particle such as, for example, the amount of nonionic monomer and acid monomer shall be determined from the overall composition of the emulsion polymer without regard for the number of stages or phases therein. The polymerization techniques used to prepare such multistage emulsion polymers are well known in the art such as, for example, U.S. Pat. Nos. 4,325,856; 4,654,397; and 4,814,373. It is also envisioned that the emulsion polymer of this invention whether prepared by a single-stage or multi-staged process may be used as either or both component(s) of a hard/soft emulsion polymer blend.

The emulsion polymer has an average particle diameter from 20 to 1000 nanometers, preferably from 70 to 300 nanometers. Particle sizes herein are those determined using a Brookhaven Model BI-90 particle sizer manufactured by Brookhaven Instruments Corporation, Holtsville N.Y., reported as "effective diameter". Also contemplated are multimodal particle size emulsion polymers wherein two or more distinct particle sizes or very broad distributions are provided as is taught in U.S. Pat. Nos. 5,340,858; 5,350,787; 5,352,720; 4,539,361; and 4,456,726.

The glass transition temperature ("Tg") of the emulsion polymer is typically from −20° C. to 100° C., preferably from −20 C. to 50 C., the monomers and amounts of the monomers selected to achieve the desired polymer Tg range are well known in the art. Tgs used herein are those calculated by using the Fox equation (T. G. Fox, Bull. Am. Physics Soc., Volume 1, Issue No. 3, page 123(1956)). that is, for calculating the Tg of a copolymer of monomers M1 and M2, $$1/Tg(\text{calc.}) = w(M1)/Tg(M1) + w(M2)/Tg(M2).$$

, wherein

Tg(calc.) is the glass transition temperature calculated for the copolymer w(M1) is the weight fraction of monomer M1 in the copolymer w(M2) is the weight fraction of monomer M2 in the copolymer Tg(M1) is the glass transition temperature of the homopolymer of M1

Tg(M2) is the glass transition temperature of the homopolymer of M2, all temperatures being in ° K.

The glass transition temperatures of homopolymers may be found, for example, in "Polymer Handbook", edited by J. Brandrup and E. H. Immergut, Interscience Publishers.

In one aspect of the present invention a method for improving the adhesion of a dry coating including: a) forming an aqueous coating composition including an aqueous acrylic emulsion polymer, the polymer including, as copolymerized units, 70 to 99.5% by weight, based on dry polymer weight, monoethylenically unsaturated nonionic (meth)acrylic monomer, 0.1 to 12.5% by weight, based on dry polymer weight, aldehyde reactive group-containing monomer, and from 0.3 to 10% by weight, based on dry polymer weight, monoethylenically unsaturated acid monomer, wherein at least 40% by weight, based on dry polymer weight, of the emulsion polymer is formed by redox polymerization in the presence of 0.001 to 0.05 moles chain transfer agent per kg dry polymer weight; b) applying the coating composition to a substrate; and c) drying, or allowing to dry, the applied coating composition. By "aldehyde reactive group-containing monomer" is meant herein a monomer which, in a homogeneous solution containing 20% by weight of the monomer and an equimolar amount of formaldehyde at any pH from 1 to 14, will exhibit greater than 10% extent of reaction between the monomer and formaldehyde on a molar basis in one day at 25° C. Included as ethylenically-unsaturated aldehyde reactive group-containing monomers are, for example, vinyl acetoacetate, acetoacetoxyethyl (meth)acrylate, acetoacetoxypropyl (meth)acrylate, allyl acetoacetate, acetoacetoxybutyl (meth) acrylate, 2,3-di(acetoacetoxy)propyl (meth)acrylate, vinyl acetoacetamide, acetoacetoxyethyl (meth)acrylamide, 3-(2-vinyloxyethylamino)-propionamide, N-(2-(meth) acryloxyethyl)-morpholinone-2,2-methyl-1-vinyl-2-imidazoline, 2-phenyl-1-vinyl-2-imidazoline, 2-(3-Oxazolidinyl)ethyl (meth)acrylate, N-(2-vinoxyethyl)-2-methyloxazolidine, 4,4-dimethyl-2-isopropenyloxazoline, 3-(4-pyridyl)propyl (meth)acrylate, 2-methyl-5-vinyl-pyridine, 2-vinoxyethylamine, 2-vinoxyethylethylenediamine, 3-aminopropyl vinyl ether, 2-amino-2-methylpropyl vinyl ether, 2-aminobutyl vinyl ether, tert-butylaminoethyl (meth)acrylate, 2-(meth) acryloxyethyldimethyl-β-propiobetaine, diethanolamine monovinyl ether, o-aniline vinyl thioether, (meth) acryloxyacetamido-ethylethyleneurea, ethyleneureidoethyl (meth)acrylate, (meth)acrylamidoethyl-ethyleneurea, (meth) acrylamidoethyl-ethylenethiourea, N-((meth) acrylamidoethyl)-N$^1$-hydroxymethylethyleneurea, N-((meth)acrylamidoethyl)-N$^1$-methoxymethyl-ethyleneurea, N-formamidoethyl-N$^1$-vinylethyleneurea, N-vinyl-N$^1$-aminoethyl-ethyleneurea, N-(ethyleneureidoethyl)-4-pentenamide, N-(ethylenethioureido-ethyl)-10-undecenamide, butyl ethyleneureido-ethyl fumarate, methyl ethyleneureido-ethyl fumarate, benzyl N-(ethyleneureido-ethyl) fumarate, benzyl N-(ethyleneureido-ethyl) maleamate, N-vinoxyethylethylene-urea, N-(ethyleneureidoethyl)-crotonamide, ureidopentyl vinyl ether, 2-ureidoethyl (meth)acrylate, N-2-(allylcarbamoto) aminoethyl imidazolidinone, 1-(2-((20hydroxy-3-(2-propenyloxy)propyl)amino)ethyl)-2-imidazolidinone, hydrogen ethyleneureidoethyl itaconamide, ethyleneureidoethyl hydrogen itaconate, bis-ethyleneureidoethyl itaconate, ethyleneureidoethyl undecylenate, ethyleneureidoethyl undecylenamide, 2-(3-methylolimidazolidone-2-yl-1)ethyl acrylate, N-acryloxyalkyl oxazolidines, acylamidoalkyl vinyl alkyleneureas, aldehyde-reactive amino group-containing monomers as dimethyaminoethyl methacrylate, and ethylenically unsaturated monomers containing aziridene functionality. Preferred is 0.25% to 5%, by weight based on total monomer weight, of a copolymerized ethylenically-unsaturated aldehyde reactive group-containing monomer, based on the weight of the polymer.

In an alternative embodiment polymers containing a sufficient amount of copolymerized monomer(s) having reactive functionality, which is not reactive with aldehydes, to provide, after reaction during or after the emulsion polymerization, 0.1–12.5%, by weight based on the total weight of the emulsion polymer, copolymerized aldehyde-reactive monomer equivalent are also contemplated. By "copolymerized monomer equivalent" is meant herein the copolymerized monomer which would have led to the copolymer even though the polymer was formed by a post-polymerization reaction rather than directly formed by the copolymerization of that monomer. In this embodiment, for example, the reaction product of polymers containing carboxylic acid functionality with compounds consisting of or containing an aziridine (ethyleneimine) ring or rings may be formed. Substitution on the ring may be on the nitrogen and/or either or both carbons such as, for example, ethyleneimine, propyleneimine, N-(2-hydroxyethyl) ethyleneimine, trimethylolpropane-tris-(β-(N-aziridinyl) propionate), and pentaerythritol trimethylolpropane-tris-(P-(N-aziridinyl) propionate). Also, polymers containing β-aminoester and/or β-hydroxyamide functionality may be formed by post-polymerization processes.

In another aspect of this invention a method for improving the adhesion of a dry coating to an alkyd substrate, particularly to an aged or weathered alkyd substrate, the aqueous coating composition including an emulsion polymer which provides a coating with inferior adhesion such as, for example, a colloidally-stabilized emulsion polymer, is provided. By "colloidally-stabilized" emulsion polymer herein is meant an emulsion polymer prepared, at least in part, in the presence of a nonionic colloidal stabilizer. Without being bound by theory, it is believed that such a process results in the grafting of at least part of the colloidal stabilizer on the emulsion polymer with beneficial effect on the rheology of coatings prepared therefrom. The method of this invention includes forming an aqueous coating composition including (1) a first aqueous emulsion polymer including 0–2%, by weight based on the total weight of the first polymer, ethylenically unsaturated aldehyde reactive group-containing monomer, the first polymer having a glass transition temperature from −60° C. to 80° C. and a particle diameter of 200 to 1000 nanometers, prepared, at least in part, in the presence of 0.001–6%, by weight based on the dry weight of said first emulsion polymer, of a colloidal stabilizer selected from the group consisting of hydroxyethyl cellulose, N-vinyl pyrrolidone, polyvinyl alcohol, partially acetylated polyvinyl alcohol, carboxymethyl cellulose, gum arabic, and mixtures thereof, and (2) a second aqueous emulsion polymer, the second polymer having a glass transition temperature (Tg) from −60° C. to 80° C. and a particle diameter of 30 to 200 nanometers, formed by the free radical polymerization of at least one ethylenically unsaturated nonionic acrylic monomer, 0.1–12.5%, preferably 0.25–7.5%, by weight based on the total weight of the second polymer, ethylenically unsaturated aldehyde reactive group-containing monomer, and 0–7.5%, by weight based on the total weight of the polymer, ethylenically unsaturated acid monomer wherein at least 40% by weight, based on dry polymer weight, of said second emulsion polymer is formed by redox polymerization in the presence of 0.001 to 0.05, preferably 0.0025 to 0.025, moles chain transfer agent per kg dry polymer weight; wherein the dry weight ratio of the second polymer to the first polymer is from 1:99 to 1:1; applying the aqueous coating composition to the alkyd substrate; and drying, or allowing to dry, the aqueous composition. The method provides adhesion improved relative to that engendered when a colloidally-stabilized emulsion polymer is used without the second emulsion polymer (the aqueous emulsion polymer used in this invention) in a corresponding aqueous coating composition. Blending of the first emulsion polymer and the second emulsion polymer may be effected prior to or while formulating the binders in an aqueous coating composition.

The amount of pigment and extender in the aqueous coating composition may vary from a pigment volume concentration (PVC) of 0 to 85 and thereby encompass coatings otherwise described in the art, for example, as clear coatings, flat coatings, satin coatings, semi-gloss coatings, gloss coatings, primers, textured coatings, and the like. The pigment volume concentration is calculated by the following formula:

$$PVC(\%) = \frac{\text{volume of pigment(s)}_\text{,} + \text{volume extender(s)}}{\text{total dry volume of paint}} \times 100.$$

The typical PVC of different optional sheen levels are set out below.

| Sheen of Dry Coating | PVC (%) |
| --- | --- |
| gloss | 15–30 |
| semi-gloss | 23–30 |
| eggshell, satin, or low lustre | 30–38 |
| flat | 38–85 |

The aqueous coating composition is prepared by techniques which are well known in the coatings art. First, if the coating composition is to be pigmented, at least one pigment may be well dispersed in an aqueous medium under high shear such as is afforded by a COWLES® mixer or, in the alternative, at least one predispersed pigment may be used. Then the acrylic emulsion polymer may be added under low shear stirring along with other coatings adjuvants as desired.

Alternatively, the emulsion polymer may be present during the pigment dispersion step. The aqueous coating composition may contain conventional coatings adjuvants such as, for example, emulsifiers, buffers, neutralizers, coalescents, thickeners or rheology modifiers, freeze-thaw additives, wet-edge aids, humectants, wetting agents, biocides, antifoaming agents, UV absorbers such as benzophenone, substituted benzophenones, and substituted acetophenones, colorants, waxes, and anti-oxidants. The aqueous coating composition may contain up to 50%, by weight based on the total dry weight of the polymer, of an emulsion polymer not meeting the limitations of the emulsion polymer of the present invention, including a film-forming and/or a non-film-forming emulsion polymer.

Preferably the aqueous coating composition contains less than 5% VOC by weight based on the total weight of the coating composition; more preferably the aqueous coating composition contains less than 3% VOC by weight based on the total weight of the coating composition; even more preferably the aqueous coating composition contains less than 1.7% VOC by weight based on the total weight of the coating composition. A volatile organic compound ("VOC") is defined herein as a carbon containing compound that has a boiling point below 280° C. at atmospheric pressure, compounds such as water and ammonia being excluded from VOCs.

A "low VOC" coating composition herein is a coating composition which contains less than 5% VOC by weight based on the total weight of the coating composition; preferably it contains between 1.7% and 0.01% by weight based on the total weight of the coating composition.

Frequently a VOC is deliberately added to a paint or coating to improve the film properties or to aid in coatings application properties. Examples are glycol ethers, organic esters, aromatic compounds, ethylene and propylene glycol, and aliphatic hydrocarbons. It is preferred that the coating composition contains less than than 5% by weight based on the total weight of the coating composition of the added VOCs and more preferably less than 1.7% by weight based on the total weight of the coating composition of the added VOCs.

Additionally, the low VOC coating composition may contain coalescing agents which are not VOCs. A coalescing agent is a compound that is added to a water-borne emulsion polymer, paint or coating and which reduces the minimum film forming temperature (MFFT) of the emulsion polymer, paint or coating by at least 1° C. The MFFT is measured using ASTM test method D2354. Examples of a coalescing aid which is not a VOC include a plasticizer, low molecular weight polymer, and surfactants. That is, a non-VOC coalescing agent is a coalescing agent which has a boiling point above 280° C. at atmospheric pressure.

Typical methods of paint or coating preparation may introduce adventitious VOCs from the emulsion polymer, biocides, defoamers, soaps, dispersants, and thickeners. These typically account for 0.1% VOC by weight based on the total weight of the coating composition. Additional methods such as steam stripping and choice of low VOC containing additives like biocides, defoamers, soaps, dispersants, and thickeners, can be used to further reduce the paint or coating to less than 0.01% VOC by weight based on the total weight of the coating composition.

In a preferred embodiment the aqueous coating composition has a PVC of 15 to 38 and has less than 5% VOC by weight based on the total weight of the coating composition. In another preferred embodiment the aqueous coating composition has a PVC of greater than 38 and has less than 3%

VOC by weight based on the total weight of the coating composition. In an additional embodiment embodiment the aqueous coating composition has a PVC of 15 to 85 and has less than 1.6% VOC by weight based on the total weight of the coating composition.

The solids content of the aqueous coating composition may be from 25% to 60% by volume. The viscosity of the aqueous polymeric composition may be from 50 KU (Krebs Units) to 120 KU as measured using a Brookfield Digital viscometer KU-1; the viscosities appropriate for different application methods vary considerably.

Conventional coatings application methods such as, for example, brushing, rolling, and spraying methods such as, for example, air-atomized spray, air-assisted spray, airless spray, high volume low pressure spray, and air-assisted airless spray may be used in the method of this invention. The aqueous coating composition may be advantageously applied to substrates such as, for example, plastic, wood, metal, primed surfaces, previously painted surfaces, weathered painted surfaces and cementitious substrates. Drying is typically allowed to proceed under ambient conditions such as, for example, at 0° C. to 35° C.

The following examples are presented to illustrate the invention and the results obtained by the test procedures.

Test Procedures

Scrub Resistance: A coating composition and a comparative composition with the same volume solids as the coating composition were drawn down on a single black vinyl chart. The compositions were drawn in such a way that the two compositions were placed side by side and drawn together by a single drawing with a 0.0762 mm (3 mil) Bird film applicator 152.4 mm (6 inch) in width. Each composition formed a 7.5 cm (3 inch) wide coating on a single chart, and the two compositions had the same coating thickness. The sample was allowed to dry at 23° C. (73° F.) and 50% relative humidity for 7 days. Abrasive scrub resistance was measured with a scrub machine (Gardner Abrasive Tester) using 10 g scrub medium and 5 ml water. A piece of 0.0254 mm (1-mil) thick and 76.2 mm (3 inch) wide vinyl shim was placed underneath the sample vinyl chart. The two side edges of the shim were in the center of each coating. The number of cycles at the first spot of each coating removed was recorded. The scrub resistance was reported as a percentage of number of cycles of the coating composition verses the comparative composition.

Alkali Resistance—Gloss Loss

Sample preparation and drying/conditioning was as for the scrub resistance test above. Both the 20 degree and 60 degree gloss were measured for each sample by using a Glossmeter (BYK-Gardner). The sample panel was then scrubbed with a scrub machine (Gardner Abrasive Tester) by using a specially prepared 454 g (1 pound) abrasion boat. The abrasion boat was wrapped with a cheesecloth pad that had initial dimensions of 230 mm×150 mm (9 inch×6 inch), and was than folded twice to form a 57 mm×150 mm (2.3 inch×6 inch) pad. The cheesecloth pad was saturated with 1% Tide detergent solution. The sample panel was first scrubbed 250 cycles; then the pad was re-saturated with 1% Tide solution and the panel scrubbed for an additional 250 cycles. The sample panel was rinsed thoroughly and dried for 24 hours at room temperature. Both the 20 degree and 60 degree gloss were again measured for the sample panel. The gloss loss was determined by the percentage gloss change before and after the Tide solution treatment.

Hydrolytic Stability: Sample preparation and drying/conditioning was as for the scrub resistance test above. The chart bearing each composition was cut into 25.4 mm×50.8 mm (1 inch×2 inch) strips and weighed. A sample strip was placed into a 60 ml (2 oz) glass jar containing 25 g of 0.5 N NaOH solution. Approximately half of the sample strip was immersed in the NaOH solution. After 48 hours, the sample strip was removed and rinsed thoroughly with water. The sample strip was dried for 24 hours and weighed again. The percentage of weight loss of the sample strip was recorded. A visual assessment of the sample was also made.

The abbreviations listed below are used throughout the examples.

| | |
|---|---|
| MAA = | Methacrylic Acid |
| BA = | Butyl Acrylate |
| MMA = | Methyl Methacrylate |
| VA = | Vinyl Acetate |
| n-DDM = | n-Dodecyl Mercaptan |
| SLS = | Sodium lauryl sulfate (28% active) |
| APS = | Ammonium persulfate |
| DI water = | Deionized water |

COMPARATIVE EXAMPLES A–D

Preparation of Emulsion Polymers

The monomers for each example (Table CE-1) were combined with 455 g DI water, 6.9 g sodium carbonate and 30.5 g SLS and emulsified with stirring. 5.2 g SLS and 400 g DI water were charged to a 3 L multi-neck flask fitted with mechanical stirring. The flask contents were heated to 85° C. under nitrogen. To the stirred kettle contents were added 35 g monomer emulsion followed by 3.5 g APS in 10 g DI water. 30 g of a 50% solution of ureido methacrylate was added to the remainder of the monomer emulsion and gradual addition of the monomer emulsion was subsequently initiated. Total addition time for monomer emulsion was 90–100 minutes. Reactor temperature was maintained at 83° C. throughout the polymerization. 20 g DI water was used to rinse the emulsion feed line to the reactor. After completion of the monomer emulsion addition the reactor was cooled to 60° C. 10 ppm ferrous sulfate, 1 g t-butyl hydroperoxide and 0.5 g D-Isoascorbic acid in aqueous solutions were added. The polymer emulsion was neutralized to pH 9–10 with ammonium hydroxide.

TABLE CE-1

Monomer Charges for Comparative Examples A–D.

| EXAMPLE | BA | MAA | MMA | n-DDM |
|---|---|---|---|---|
| Comp. A | 480 g | 20 g | 485 g | 0 |
| Comp. B | 480 g | 20 g | 485 g | 1.25 g |
| Comp. C | 480 g | 20 g | 485 g | 2.5 g |
| Comp. D | 480 g | 20 g | 485 g | 5 g |

TABLE CE-2

Physical Properties for Comparative Examples A–D.

| EXAMPLE | SOLIDS (%) | PARTICLE SIZE (nm) | pH | VISCOSITY (cps) |
|---|---|---|---|---|
| Comp. A | 50.1 | 127 | 9.7 | 1284 |
| Comp. B | 50.4 | 119 | 10.0 | 1464 |
| Comp. C | 50.3 | 128 | 9.7 | 1440 |
| Comp. D | 49.2 | 129 | 9.8 | 1308 |

Notes:
Particle Size determined by Brookhaven Instruments BI-90 Particle Sizer
Total Solids determined by weight loss after 30–45 minutes at 150° C.
Viscosity determined using Brookfield LVTD Viscometer @ 60 rpm

EXAMPLES 1–3 AND COMPARATIVE EXAMPLE E

Preparation of Acrylic Emulsion Polymers

The monomers for each example (Table 1-1) were combined with 400 g DI water, 6.9 g sodium carbonate and 30.5 g SLS and emulsified with stirring. 5.2 g SLS and 380 g DI water were charged to a 3 L multi-neck flask fitted with mechanical stirring. The flask contents were heated to 65° C. under nitrogen. To the stirred kettle contents were added 35 g monomer emulsion followed by 0.02 g ferrous sulfate heptahydrate and 0.02 g tetrasodium salt of ethylenediamine-tetraacetic acid in 15.6 g DI water. Polymerization was initiated by the addition of 0.54 g APS in 8 g DI water followed by 0.27 g sodium hydrosulfite in 8 g DI water. 30 grams of a 50% solution of ureido methacrylate was added to the remainder of the monomer emulsion and gradual addition of the monomer emulsion was subsequently initiated. Separate solutions of 2.9 g APS in 50 g DI water and 1 g of D-Isoascorbic acid in 50 g DI water were fed concurrently with the monomer emulsion. Total addition time for the three feeds was 90–100 minutes. Reactor temperature was maintained at 65° C. throughout the polymerization. 20 g DI water was used to rinse the emulsion feed line to the reactor. After completion of the monomer emulsion addition the reactor was cooled to 60° C. 10 ppm ferrous sulfate, 1 g t-butyl hydroperoxide and 0.5 g D-Isoascorbic acid in aqueous solutions were added. The polymer emulsion was neutralized to pH 9–10 with ammonium hydroxide.

TABLE 1-1

Monomer Charges for Examples 1–3 and Comp. E

| EXAMPLE | BA | MAA | MMA | n-DDM |
|---|---|---|---|---|
| Comp. E | 480 g | 20 g | 485 g | 0 |
| 1 | 480 g | 20 g | 485 g | 1.25 g |
| 2 | 480 g | 20 g | 485 g | 2.5 g |
| 3 | 480 g | 20 g | 485 g | 5 g |

TABLE 1-2

Physical Properties for Examples 1–3 and Comp. E

| EXAMPLE | SOLIDS (%) | PARTICLE SIZE (nm) | pH | VISCOSITY (cps) |
|---|---|---|---|---|
| Comp. E | 49.6 | 164 | 9.3 | 314 |
| 1 | 49.4 | 145 | 9.9 | 207 |
| 2 | 49.8 | 162 | 9.5 | 390 |
| 3 | 49.5 | 158 | 9.6 | 428 |

Notes:
Particle Size determined by Brookhaven Instruments BI-90 Particle Sizer
Total Solids determined by weight loss after 30–45 minutes at 150° C.
Viscosity determined using Brookfield LVTD Viscometer @ 60 rpm Comparative Examples BA to BF are made as was Comparative Example B with the exception that the 30.5 g SLS is used in the make-up of the monomer emulsion and the 5.2 g SLS added to the reaction vessel is replaced with the surfactant charges listed in TABLE 1

TABLE 1

Comparative Examples

| COMPARATIVE EXAMPLE | SURFACTANT | KETTLE SURFACTANT CHARGE | MOMOMER EMULSION SURFACTANT CHARGE |
|---|---|---|---|
| BA | Ammonium nonylphenoxy polyethoxy sulfate, 60% active (Polystep ™ B-1) | 2.4 g | 14.2 g |
| BB | Sodium dodecylbenzene sulfonate, 23% active | 6.3 g | 37 g |
| BC | Polyethylene glycol lauryl ether sodium sulfate, 28% active (Steol ™ 4N) | 5.2 g | 30.5 g |
| BD | Mono(nonyl)phenoxy poly(ethyleneoxy)ethyl phosphate ammonium salt, 50% active (Wayfos ™ M-60) | 2.9 g | 17 g |
| BE | Octylphenoxypolyethoxyethanol, 70% active (Triton ™ X-405) | 2.1 g | 12.2 g |

TABLE 1-continued

Comparative Examples

| COMPARATIVE EXAMPLE | SURFACTANT | KETTLE SURFACTANT CHARGE | MOMOMER EMULSION SURFACTANT CHARGE |
|---|---|---|---|
| BF | Disodium ethoxylated nonylphenol, half ester of sulfosuccinic acid, 33% active (Aerosol ™ A-103) | 4.4 g | 25.8 g |

Examples 1A to 1F are made as was Example 1 with the exception that the 30.5 g SLS used in the make-up of the monomer emulsion and the 5.2 g SLS added to the reaction vessel are replaced with the surfactant charges listed in TABLE 2.

| EXAMPLE | SURFACTANT | KETTLE SURFACTANT CHARGE | MOMOMER EMULSION SURFACTANT CHARGE |
|---|---|---|---|
| 1A | Ammonium nonylphenoxy polyethoxy sulfate, 60% active (POLYSTEP ™ B-1) | 2.4 g | 14.2 g |
| 1B | Sodium dodecylbenzene sulfonate, 23% active | 6.3 g | 37 g |
| 1C | Polyethylene glycol lauryl ether sodium sulfate, 28% active (STEOL ™ 4N) | 5.2 g | 30.5 g |
| 1D | Mono(nonyl)phenoxy poly(ethyleneoxy)ethyl phosphate ammonium salt, 50% active (WAYFOS ™ M-60) | 2.9 g | 17 g |
| 1E | Octylphenoxypolyethoxyethanol, 70% active (TRITON ™ X-405) | 2.1 g | 12.2 g |
| 1F | Disodium ethoxylated nonylphenol, half ester of sulfosuccinic acid, 33% active (AEROSOL ™ A-103) | 4.4 g | 25.8 g |

POLYSTEP and STEOL are Trademarks of the Stepan Company
TRITON is a Trademark of the Dow Chemical Company
AEROSOL is a Trademark of Cytec Industries Inc.
WAYFOS is a Trademark of BASF Corporation

EXAMPLE 4

Formation of Aqueous Coating Compositions

All aqueous coating compositions were made using the following formulation:

| Material | Grams |
|---|---|
| Propylene Glycol | 18.2 |
| Pigment Dispersant (TAMOL ™ 731) | 6.45 |
| Defoamer (FOAMASTER ™ VL) | 0.5 |
| Titanium dioxide (TI-PURE ™ R-900) | 126.50 |
| Water | 31.0 |

The preceding ingredients were mixed in a high shear Cowles mixer and then the following ingredients were added with low shear mixing

| | |
|---|---|
| Emulsion Polymer | 232.29 |
| Opaque Polymer (ROPAQUE ™ ULTRA) | 14.40 |
| Coalescent (TEXANOL ™) | 4.83 |
| Defoamer (FOAMASTER ™ VL) | 0.5 |
| Rheology modifier (ACRYSOL ™ RM-1020) | 14.2 |
| Rheology modifier (ACRYSOL ™ RM-825) | 0.25 |
| Water | 77.79 |

Note: TAMOL, ROPAQUE and ACRYSOL are trademarks of Rohm and Haas Company. FOAMASTER is a trademark of Henkel Corp. TI-PURE is a trademark of EI DuPont de Nemours. Co. TEXANOL is a trade mark of Eastman Chemical Co.

These aqueous coating compositions contain 4.4% VOC by weight based on the total weight of the coating composition.

EXAMPLE 5

Evaluation of Scrub Resistance of Dry Coatings

Aqueous coating compositions according to Example 4 were prepared as with the emulsion polymers of Examples 1–3 and Comparative Examples A–E. The dry film of each aqueous coating composition was evaluated for scrub resistance; results are presented in

TABLE 5-1

Scrub resistance results

| | Emulsion Sample | | | | | | | |
|---|---|---|---|---|---|---|---|---|
| | Comp. A | Comp. B | Comp. C | Comp. D | Comp. E | 1 | 2 | 3 |
| Polymer Process | thermal | thermal | thermal | thermal | redox | redox | redox | redox |
| CTA Level | 0.00% | 0.125% | 0.25% | 0.50% | 0.00% | 0.125% | 0.25% | 0.50% |
| Scrub Resistance (as % of Comp. A) | 100 | 123 | 94 | 95 | 123 | 155 | 167 | 117 |

The dry film of the aqueous coating composition containing the emulsion polymer of Example 1 of this invention provides scrub resistance superior to that of the corresponding composition containing the emulsion polymer of Comparative Example B. The dry film of the aqueous coating composition containing the emulsion polymer of Example 2 of this invention provides scrub resistance superior to that of the corresponding composition of Comparative Example C. The dry film of aqueous coating composition containing the emulsion polymer of Example 3 of this invention provides scrub resistance superior to that of the corresponding composition of Comparative Example D. Dry films of preferred aqueous coating compositions containing the emulsion polymer of Examples 1 and 2 of this invention provide scrub resistance substantially superior to that of compositions of Comparative Examples A–E.

EXAMPLE 6

Evaluation of Alkali Resistance—Gloss Loss

Aqueous coating compositions were prepared according to Example 4 incorporating the aqueous emulsion polymers of Examples 1 and 2, and Comparative Example F, a p(74.8 VA/24.8 BA/0.4 acid) emulsion polymer. A dry film of the three compositions was prepared on a single black vinyl chart and the Alkali Resistance—Gloss Loss of the film was determined. Results are presented in Table 6-1.

TABLE 6.1

Evaluation of alkali resistance

| | 20° Gloss | | | 60° Gloss | | |
|---|---|---|---|---|---|---|
| Sample | Before Tide Treatment | After Tide Treatment | Gloss Change (%) | Before Tide Treatment | After Tide Treatment | Gloss Change (%) |
| Comp. Ex. F | 29.6 | 25.5 | -13.9 | 68.5 | 64.0 | -6.6 |
| Example 1 | 28.0 | 28.9 | 3.2 | 66.1 | 67.7 | 2.4 |
| Example 2 | 27.9 | 29.3 | 5.0 | 66.4 | 68.1 | 2.6 |

The dry films of aqueous coating compositions containing aqueous acrylic emulsion polymers of Examples 1 and 2 of this invention exhibit no gloss loss and thereby pass the test.

EXAMPLE 7

Evaluation of Hydrolytic Stability

Aqueous coating compositions were prepared according to Example 4 incorporating the aqueous emulsion polymers of Examples 1 and 2, and Comparative Example F, a p(74.8 VA/24.8 BA/0.4 acid) emulsion polymer. A dry film of the three compositions was prepared on a single black vinyl chart and the Hydrolytic Stability was determined. Results are 4p presented in Table 7-1.

TABLE 7.1

Evaluation of hydrolytic stability

| | Weight Loss of Whole Sample Strip | | | |
|---|---|---|---|---|
| Sample | Before NaOH Treatment (g) | After NaOH Treatment (g) | Weight Loss (%) | Visual Assessment of the Coating Immersed in NaOH |
| Comp. Ex. F | 0.61 | 0.51 | 16% | Completely Dissolved |
| Example 1 | 0.63 | 0.63 | 0% | Unchanged |
| Example 2 | 0.58 | 0.58 | 0% | Unchanged |

The dry films of aqueous coating compositions containing aqueous acrylic emulsion polymers of Examples 1 and 2 of this invention exhibit no dissolution and thereby pass the test.

EXAMPLE 8

Evaluation of Adhesion of Dry Coatings

Aqueous coating compositions are prepared according to Example 4 incorporating the aqueous emulsion polymers of Examples 1–3 and 1A–1F and Comparative Examples B–D and BA–BF. The aqueous coating compositions are applied to a coating of Duron Superior House & Trim Exterior Alkyd House Paint—Forest Green Color (Maunfactured by Duron, Inc., Beltsville, Md.) which has been painted onto a substrate and allowed to air dry and cure at room temperature for a period of 4 months. Adhesion to the alkyd substrate is measured by the method of ASTM 4541.

The alkyd adhesion of the aqueous coating composition containing the emulsion polymer of Example 1 is superior to that of Comparative Example B, that of Example 2 is superior to that of Comparative Example C, that of Example 3 is superior to that of Comparative Example D, that of Example 1A is superior to that of Comparative Example BA, that of Example 1B is superior to that of Comparative Example BB, that of Example 1C is superior to that of Comparative Example BC, that of Example 1 D is superior to that of Comparative Example BD, that of Example 1E is superior to that of Comparative Example BE, and that of Example 1F is superior to that of Comparative Example BF.

EXAMPLE 9 AND COMPARATIVE EXAMPLE G

Preparation of Acrylic Emulsion Polymers

The monomers for Comp. Ex. G (Table 9-1) were combined with 455 g DI water, 6.9 g sodium carbonate and 30.5 g SLS and emulsified with stirring. 5.2 g SLS and 400 g DI water were charged to a 3 L multi-neck flask fitted with mechanical stirring. The flask contents were heated to 85° C. under nitrogen. To the stirred kettle contents were added 35 g monomer emulsion followed by 3.5 g APS in 10 g DI water. 30 g of a 50% solution of ureido methacrylate was added to the remainder of the monomer emulsion and gradual addition of the monomer emulsion was subsequently initiated. Total addition time for monomer emulsion was 90–100 minutes. Reactor temperature was maintained at 83° C. throughout the polymerization. 20 g DI water was used to rinse the emulsion feed line to the reactor. After completion of the monomer emulsion addition the reactor was cooled to 60° C. 10 ppm ferrous sulfate, 1 g t-butyl hydroperoxide and 0.5 g D-Isoascorbic acid in aqueous solutions were added. The polymer emulsion was neutralized to pH 9–10 with ammonium hydroxide.

The monomers for Example 9 (Table 9-1) were combined with 400 g DI water, 6.9 g sodium carbonate and 30.5 g SLS and emulsified with stirring. 5.2 g SLS and 380 g DI water were charged to a 3 L multi-neck flask fitted with mechanical stirring. The flask contents were heated to 65° C. under nitrogen. To the stirred kettle contents were added 35 g monomer emulsion followed by 0.02 g ferrous sulfate heptahydrate and 0.02 g tetrasodium salt of ethylenediaminetetraacetic acid in 15.6 g DI water. Polymerization was initiated by the addition of 0.54 g APS in 8 g DI water followed by 0.27 g sodium hydrosulfite in 8 g DI water. 30 g of a 50% solution of ureido methacrylate was added to the remainder of the monomer emulsion and gradual addition of the monomer emulsion was subsequently initiated. Separate solutions of 2.9 g APS in 50 g DI water and 1 g of D-Isoascorbic acid in 50 g DI water were fed concurrently with the monomer emulsion. Total addition time for the three feeds was 90–100 minutes. Reactor temperature was maintained at 65° C. throughout the polymerization. 20 g DI water was used to rinse the emulsion feed line to the reactor. After completion of the monomer emulsion addition the reactor was cooled to 60° C. 10 ppm ferrous sulfate, 1 g t-butyl hydroperoxide and 0.5 g D-Isoascorbic acid in aqueous solutions were added. The polymer emulsion was neutralized to pH 9–10 with ammonium hydroxide.

TABLE 9-1

| | Monomer Charges | | | |
|---|---|---|---|---|
| Emulsion Polymer | BA | MMA | MAA | n-DDM |
| Comp. Ex. G | 600 g | 365 g | 20 g | 0 |
| Example 9 | 600 g | 365 g | 20 g | 1.25 |

EXAMPLE 10

Formation of Aqueous Coating Compositions

The Grind Premix was made using ingredients in the ratios in Table 10.1 and mixed on a high speed Cowles disperser for 20 minutes. A portion of the Grind Premix that contained the ingredients in the amounts listed in Table 1 was transferred to another container for each paint and the Let Down ingredients were added under low speed mixing in the order given. The final pigment volume concentration for each paint was 19% and the volume solids was 36%. The VOC of the aqueous coating compositions is 0.1% by weight based on the total weight of the coating composition.

TABLE 10.1

| | Aqueous coating composition | |
|---|---|---|
| Material | Comp. Example H Weight (g) | Example 10 Weight (g) |
| Grind Premix | | |
| TAMOL ™ 731A | 6.04 | 6.04 |
| TEGO ™ Foamex 810 | 0.49 | 0.49 |
| SURFYNOL ™ CT-111 | 0.97 | 0.97 |
| TI-PURE ™ R-706 | 114.19 | 114.19 |
| Water | 26.89 | 26.89 |
| Let Down | | |
| Water | 10 | 10 |
| Emul. Pol. Comp. G (50.2% Solids) | 269.03 | 0 |
| Emul. Pol. Ex. 9 (49.5% Solids) | 0 | 275.57 |
| SURFYNOL ™ CT-111 | .5 | .5 |
| ACRYSOL ™ RM-2020NPR | 14.2 | 11.5 |
| ACRYSOL ™ RM-8W | 1.9 | 2.70 |
| Water | 73.11 | 68.18 |

Note:
SURFYNOL is a trademark of Air Products and Chemicals Inc; TEGO is a trademark of Tego Chemie Service.

A scrub test was run on two specimens of each example following the procedure outlined in ASTM test method D2486-00 with the following exceptions: a Bird 3 mil film applicator was used to draw down the paints, and the test specimens were held down on each side of the shim midway between the shim and the end of the specimen directly by clamping rather than by means of a gasketed frame as outlined in ASTM D2486. Method A of the test method was otherwise followed. The data obtained is given in Table 9.2.

TABLE 10.2

| Scrub Resistance Test Results, Cycles to Fail | |
|---|---|
| Coating | Average of 2 Specimens |
| Comparative Example H | 474 |
| Example 10 | 1860 |

The dry film of the aqueous coating composition containing the emulsion polymer of Example 10 of this invention provided scrub resistance superior to that of the corresponding composition containing the emulsion polymer of Comparative Example H.

EXAMPLE 11 AND COMPARATIVES J–K

Preparation of Aqueous Emulsion Polymers and Evaluation of Adhesion of Blends to Alkyds Preparation of Example 11

This polymer is made according to the process of Example 1A with the exception that the 485 g MMA used in the making of the monomer emulsion is reduced to 450 g and 100 g 50% solution of ureido methacrylate is charged to the monomer emulsion at the point where 30 g 50% solution of ureido methacrylate iss charged in Example 1A.

Preparation of Comparative Example J.

This polymer is made according to the process of Comparative Example BA with the exception that the 485 g MMA used in the making of the monomer emulsion is reduced to 450 g and 100 g 50% solution of ureido methacrylate is charged to the monomer emulsion at the point where 30 g 50% solution of ureido methacrylate is charged in Comparative Example BA.

Preparation of Comparative Example K.

To a three liter flask is charged 340 g DI water which is heated to 85° C. Then 11.0 g 45% solids 100 nm acrylic emulsion, rinsed with 5 g DI water, 3.6 g ammonium persulfate dissolved in 10 g DI water and 0.5 g (29%) aqueous ammonium hydroxide dissolved in 10 g DI water are added. A monomer emulsion consisting of 310 g deionized water, 2.4 g (23% active) sodium dodecylbenzenesulfonate, 416 g BA, 523.8 g MMA, and 12.3 g MAA is prepared. A 94% by weight portion of the monomer emulsion is then fed to the flask over a period of two hours. The reaction to prepare the emulsion polymer is carried out at 85° C. The flask contents are then cooled gradually to 60° C. over a period of one hour. 15 g of a 0.1% iron sulfate heptahydrate solution is mixed with 1.5 g 1.0% Versene solution and added to the flask. This is followed by feeding of three separate mixtures beginning at the same time. The first mixture is 1.9% by weight, based on the weight of the emulsion polymer, hydroxyethyl cellulose (as a 7.4% solution of CELLOSIZE® Hydroxyethyl Cellulose QP3L (Union Carbide)) mixed with 6.0% of the monomer emulsion (described above) which is fed over 17 minutes. The second mixture is a solution of 1.4 g of ammonium persulfate dissolved in 25 g DI water. The third mixture is a solution of 0.3 g sodium sulfoxylate formaldehyde dissolved in 25 g DI water which is fed over 20 minutes. The reaction mixture is held at 60° C. for 20 minutes then 9.7 g (29%) aqueous ammonium hydroxide dissolved in 10 g DI water is added. A solution of 0.35 g (70%) t-butyl hydroperoxide dissolved in 5 g DI water and a solution of 0.17 g isoascorbic acid dissolved in 7.5 g DI water are added. The polymer is expected to have a particle size of approximately 550 nm, and a total solids content of 49.3.

Preparation of Polymer Blends.

Blend 1. 15 parts emulsion polymer Example 11 is added to 100 parts emulsion polymer Comp. K with mechanical stirring. Comp. Blend A. 15 parts emulsion polymer Comp. J is added to 100 parts emulsion polymer Comp. K with mechanical stirring.

Preparation of Aqueous Coating Composition.

A white paint is prepared by forming a dispersion containing 72 g propylene glycol, 13.6 g TAMOL™ 731 (25.0%)pigment dispersant, 1.48 g FOAMASTER™ VL(defoamer), and 267.64 g titanium dioxide (Ti-Pure™ R-900) using a COWLES disperser, followed by the addition of the emulsion polymer blend, TEXANOL™ coalescent, and NATROSOL™ 250 MR thickener solution and water to provide an aqueous coating with PVC (pigment volume concentration)=23.65 and VS(volume solids)=34.

Evaluation of Adhesion to Alkyd.

The aqueous coating compositions are applied to a coating of Duron Superior House & Trim Exterior Alkyd House Paint—Forest Green Color (Maunfactured by Duron,Inc., Beltsville, Md.) which has been painted onto a substrate and allowed to air dry and cure at room temperature for a period of 4 months. Adhesion to the alkyd substrate is measured by the method of ASTM 4541.

The alkyd adhesion of the aqueous coating composition containing the emulsion polymer Blend 1 is superior to that of Comparative Blend A.

What is claimed is:

1. An aqueous acrylic emulsion polymer comprising, as copolymerized units, 70 to 99.5% by weight, based on dry polymer weight, monoethylenically unsaturated nonionic (meth)acrylic monomer and from 0.3 to 10% by weight, based on dry polymer weight, monoethylenically unsaturated acid monomer, wherein at least 40% by weight, based on dry polymer weight, of said emulsion polymer is formed by redox polymerization at a pH of from 4 to 8 in the presence of 0.001 to 0.05 moles chain transfer agent per kg dry polymer weight and a redox reaction catalyzing metal salt.

2. The acrylic emulsion polymer of claim 1 wherein said redox polymerization is effected in the presence of 0.0025 to 0.025 moles chain transfer agent per kg dry polymer weight.

3. An aqueous coating composition comprising an aqueous acrylic emulsion polymer, said polymer comprising, as copolymerized units, 70 to 99.5% by weight, based on dry polymer weight, monoethylenically unsaturated nonionic (meth)acrylic monomer and from 0.3 to 10% by weight, based on dry polymer weight, monoethylenically unsaturated acid monomer, wherein at least 40% by weight, based on dry polymer weight, of said emulsion polymer is formed by redox emulsion polymerization at a pH of from 4 to 8 in the presence of 0.001 to 0.05 moles chain transfer agent per kg dry polymer weight and a redox reaction catalyzing metal salt.

4. The aqueous coating composition of claim 3 wherein said redox polymerization is effected in the presence of 0.0025 to 0.025 moles chain transfer agent per kg dry polymer weight.

5. The aqueous coating composition of claim 3 having a PVC of 15 to 38 and having VOC less than 5% by weight based on the total weight of the coating composition.

6. The aqueous coating composition of claim 3 having a PVC greater than 38 and having VOC less than 3% by weight based on the total weight of the coating composition.

7. The aqueous coating composition of claim 3 having a PVC of 15 to 85 and having VOC less than 1.7% by weight based on the total weight of the coating composition.

* * * * *